April 8, 1947. J. F. MORSE ET AL 2,418,594
SHUTTER AND FILM-WIND INTERLOCK
Filed June 14, 1943 4 Sheets-Sheet 1

INVENTORS
John F. Morse &
Harry L. Hosterman
BY
ATTORNEYS

INVENTORS
John F. Morse &
Harry L. Hosterman
BY
ATTORNEYS

Patented Apr. 8, 1947

2,418,594

UNITED STATES PATENT OFFICE 2,418,594

SHUTTER AND FILM-WIND INTERLOCK

John F. Morse, Hudson, and Harry L. Hosterman, Akron, Ohio; said Hosterman assignor to said Morse Application June 14, 1943, Serial No. 490,940

34 Claims. (Cl. 95—31)

The present invention relates to cameras of the type employing focal plane shutters and particularly to cameras used in aerial photography, the purpose of the invention being to improve upon the mechanism for operating the shutter, feeding the film and actuating the other elements of such a camera.

It is one of the objects of the invention to devise a camera of this type in which the spacing of the film is more accurately measured and controlled so as to secure the maximum number of exposures on a given length of film and to space the exposures accurately so that as little film is wasted as is possible without overlapping. For this purpose there is employed a spacing and feeding mechanism including an idler roll over which the film is run which insures that the film will be advanced to exactly the proper extent after the taking of each picture.

In the usual type of camera for this purpose there is provided a roll which rides on the surface of the receiving or wind-up spool, this roll being adapted to control the feed mechanism by its position relative to the axis of the roll. This type of device is not satisfactory because the spacing of the exposure is not accurately done and much valuable film may be lost, or the pictures may overlap if too close spacing is attempted. The measuring mechanism shown herein obviates all of these objections of the prior art and secures the accurate and close spacing which is very desirable in cameras of this type.

It has been proposed heretofore to utilize measuring rolls for this purpose, but devices of this nature have never been commercially employed because they were not practical or positive. In the mechanism shown and described herein, practical and efficient means have been provided for adapting the measuring roll type of film feed control to cameras of this type.

It is also an object of the invention to provide a new and useful mechanism for automatically actuating the focal plane shutter. In the form of the invention shown herein, the shutter is combined with a motor driving mechanism which will rewind the shutter after each exposure and set the parts for the next exposure. The operation of the device is very rapid and efficient so that pictures may be taken in quick succession. All that the operator is required to do is to release the shutter for the exposure and the resetting of the parts and the advancement of the film takes place instantaneously.

It is a further purpose of the invention to combine the shutter mechanism just described with the new form of film measuring and advancing means. It is a further object of the invention to combine the improvements specified with a focal plane shutter formed of two superposed curtains or blinds each equipped with a slot, the slots in the two curtains overlying to form the exposure slot. One of these blinds or curtains is adjustable with respect to the other so that the effective width of the exposure aperture and thereby the time interval of the exposure is determinable and adjustable by shifting the relative position of the blinds. This adjustment is secured by passing one of the curtains over a movable guide roll which is shiftable to alter the relative position of the blinds. This new form of shutter, per se, is the sole invention of John F. Morse and is described in application Serial No. 421,214, filed December 1, 1941, now patent number 2,335,690, issued November 30, 1943.

It is a further object of the invention to provide in a mechanism such as shown herein light traps or closures which are opened as the picture is taken and closed immediately thereafter so that no light enters the camera during the rewinding of the shutter and the advancement of the film. This light trap mechanism is combined with the other operative parts of the camera so that the operation of the light trap is certainly and positively performed.

It is also an object of the invention to provide improved mechanism for operating the various elements of the camera which is relatively simple, effective and will not readily get out of operative condition. It will be understood that while the invention is shown in considerable detail as the preferred embodiment and best known form of the invention, improvements and changes may be made without altering the basic principles of the invention as set forth in the claims.

In the drawings in which the present, most highly perfected form of the invention is shown:

Fig. 1 is a vertical section taken between the front plate of the machine and an outer bearing plate, the plane of the section being indicated by the line 1—1 on Fig. 3. It shows the internal mechanism of an aerial camera equipped with the improvements, certain standard parts of the camera being omitted as any suitable devices or arrangements may be used in conjunction with the improved features. In this view the mechanism is shown in the position in which it is ready for the taking of a picture.

Fig 9 is an enlarged detail of the measuring gear and its associated disk, the latter being partly broken away.

Fig. 10 is a view of the film supply roll and the spring rolls for actuating the shutter.

Fig. 12 is a detail section on the line 12—12 of Fig. 1 showing the light trap closing means.

The shutter and film actuating mechanism which is shown herein is located within any suitable camera housing which is not shown. There is shown herein a light trap which is closed to prevent light from entering the camera while the shutter is being rewound, and while the form of light trap is preferred and is combined with the other elements, a different form of light trap may be substituted. Such devices are necessary with a focal plane shutter of the type shown herein where the aperture in the shutter is not closed during rewinding.

The mechanism which is shown comprises a front plate 1 and a rear plate 2 between which the film, film spools and the shutter are located. A smaller bearing plate 3 is located on the face of the front plate and much of the mechanism described is mounted between the plates 1 and 3. The several plates are held together by tie bolts suitably arranged.

Figure 1:
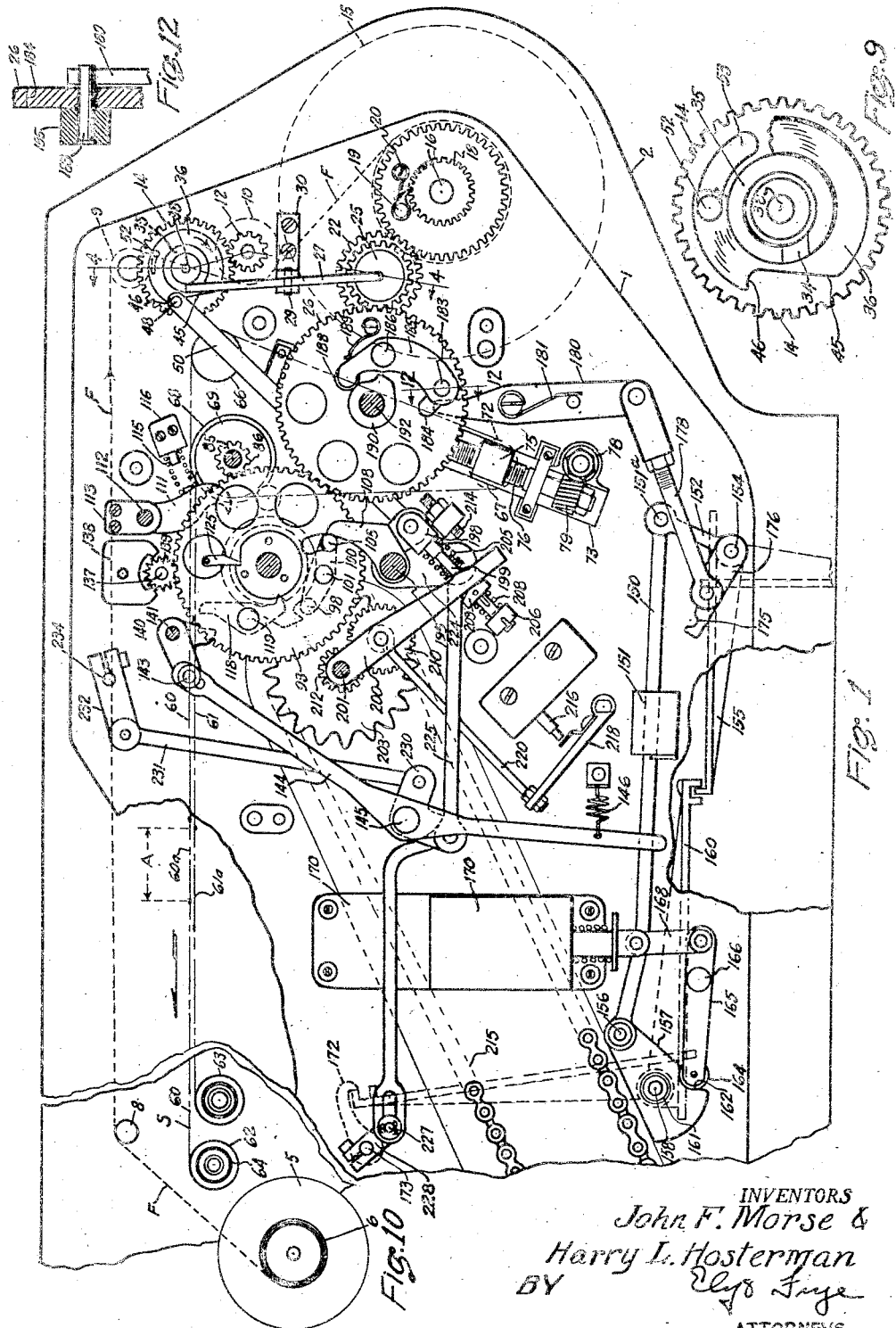

The film is indicated by the letter F and moves in the direction of the arrow applied thereto in Fig. 1. It is supplied from the storage or loaded spool 5 mounted to the left of the machine as viewed in Fig. 1. The shaft of the spool is provided with any suitable type of brake or drag, indicated at 6, which exerts a light tension on the spool to prevent it from overrunning. From the spool the film passes over a guide roll 8 and thence to a guide roll 9 at the right of the device. From the roll 9 the film passes partly around and drives the roll 10 which bears against the back or non-emulsion side of the film and constitutes the measuring roll to which reference has been made.

The pilot or measuring roll 10 is preferably provided with a surface which will not slip on the film so that the measuring and spacing of the exposures will be accurately performed. For this purpose it may be made of or covered with a natural or synthetic rubber. The circumference of the roll in the form shown bears a definite relation to the width of a single exposure, so that with the selected number of complete revolutions the film will be advanced just sufficiently to locate the exposures accurately along the film. In the mechanism illustrated, the circumference of the roll 10 is one-third of the total distance which it is desired to advance the film after each exposure. The shaft of the roll 10, therefore, has fixed thereto a pinion 12 having a number of teeth equal to one-third of the number of teeth on the gear 14 with which it meshes and which may be designated as the measuring gear. One complete revolution of the gear 14 will advance the film for one exposure. Any other relation of circumference of the roll 10 and the ratio between the gears 12 and 14 may be adopted so that exact spacing of the film is secured.

From the roll 10 the film F passes to the wind-up spool 15 which is mounted between the plates 1 and 2. The shaft 16 of the film wind-up spool extends through the plate 1 and is provided with a pinion 18 engaged by a spring held pawl 19 on the surface of the larger driving gear 20 rotatably mounted on the shaft 16. This arrangement permits of rotating the spool independently of its driving mechanism, as is desirable in loading a film in the camera.

Figure 5:
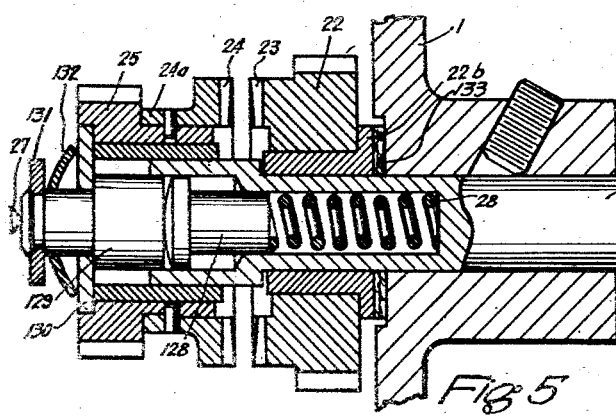
Fig. 5 is an enlarged detail through the clutch shown in Fig. 4.
Figure 11:
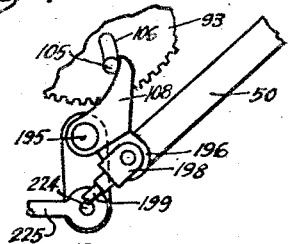
Fig. 11 is an enlarged detail of the so-called trigger lever.

The gear 20 is driven for the film winding operation by a gear 22 which is fixed to a shaft 22$^a$ located in the plate 1, having a sleeve 22$^b$ on which the gear 22 is non-rotatably mounted. This gear 22 constitutes the driven member of a clutch composed of the two mating ratchet disks 23 and 24, the former being formed on the face of the gear 22 and the latter on a collar 24$^a$ fixed on the rear of a second gear 25 mounted on the end of the shaft 22$^a$. The two gears are forced apart and the clutch maintained in open position by a spring 28 except when the spool 15 is being wound. The spring 28 is housed in the end of the shaft 22$^a$ and bears against a headed pin 128 the outer end of which rests against second pin 129, the reduced end of which passes through a plate 130 seated in the outer face of the gear 25 (Fig. 5). The outer projecting end of the pin 129 has a fixed bearing washer 131, and between the plate 130 and washer 131 is located the arched, metal spring disk 132. A cushioning washer 133 is located between the sleeve 22$^b$ and the plate 1. The gear 25 is in mesh with the spool driving gear 20.

Bearing against the end of the pin 129 is the lower, rounded end of operating lever 27 pivotally mounted at 29 on a bracket 30 secured to the plate 1. The opposite or upper end of the lever 27 is provided with a turned down hook-like extremity 32 which, when the clutch 23—24 is separated, seats in a notch 34 cut in the top of a ring-like wall or flange 35 formed on the outer face of a disk 36 rotatably mounted on the shaft 38 which projects from the plate 2 and forms the bearing for the measuring gear 14.

Figure 4:
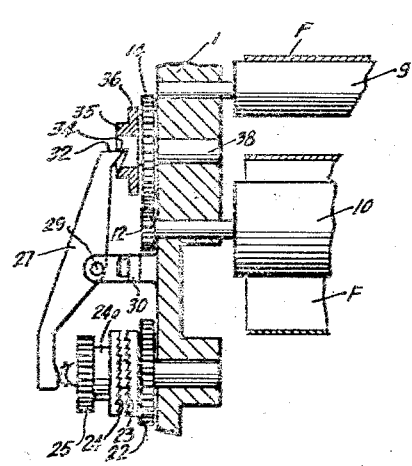
Fig. 4 is a section on the line 4—4 of Fig. 1 showing the measuring gear and associated parts.

It will be seen that when the mechanism is in the position shown in Fig. 4 with the end of the lever 27 seated in the notch 34, the measuring gear and the measuring roll are prevented from backward motion and the clutch 23—24 on the wind-up spool is disengaged, and this condition is maintained until the shutter has completed its movement to make the exposure. When the shutter has completed its movement to take the picture, the clutch members are engaged against the force of the spring 28 through the actuation of the disk 36 and the measuring gear, as will be described. When the measuring gear has completed its revolution and the lever 27 returned to the position shown in Fig. 4, the clutch is restored to open position and the feed of the film is stopped. During the film feeding, the focal plane shutter is reset, the light trap referred to above intervening to prevent the admission of light to the camera during this operation.

The actuation of the measuring roll will now be described to the extent necessary to a completion of this portion of the description.

Figure 2:
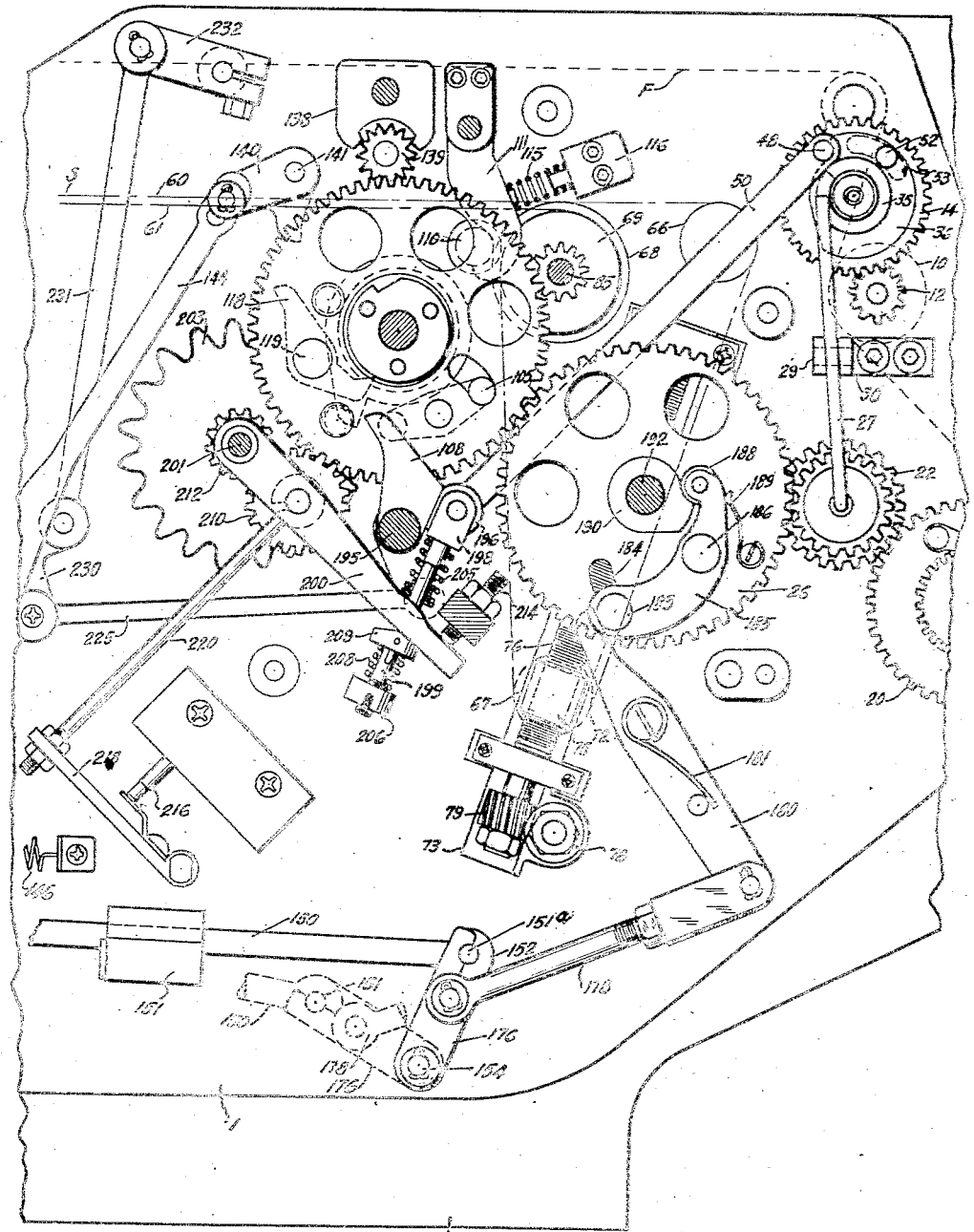
Fig. 2 is a similar but somewhat enlarged view of the main operative parts of the mechanism, but showing the position after the exposure and when the film is about to be advanced and the shutter completely unwound.

The rim of the disk 36 is cut away at 45 to provide a shoulder or tooth 46, (Fig. 9), and when the parts are in idle position as shown in Fig. 1, a pin 48 on the end of a swinging lever or thrust rod 50 rests in the notch against the shoulder 46. At the proper time and through mechanism to be described, the rod 50 is pushed upwardly, moving the disk 36 through a substantial arc in the direction of the arrow in Fig. 1 sufficiently to move the hooked end of the lever 27 out of the notch 34 and onto the top of the flange 35, as shown in Fig. 2. This causes the lower end of the lever 27 to be forced inwardly, closing the clutch 23—24, and power transmitted from the gear 26 will wind the spool 15.

The measuring gear 14 is connected to the disk 36 by the following means. Projecting from the rear of the disk 36 is a pin 52 which is received in an arcuate slot 53 formed in the gear 14. This arrangement is necessary to prevent rotation of the measuring gear by the thrust of the lever 50, it being essential that the measuring gear be moved only by the movement of the film transmitted through the measuring roll 10, and for this reason the slot 53 is at least as long as the arc described by the pin due to the thrust of the rod 50. As the gear 14 rotates, it will pick up the pin 52 when it reaches the end of the slot 53 and carry the disk 36 with it until the lever 27 drops into the notch 34, at which time the pin 48 will drop into the notch 46, it having ridden on the rim of the disk in the meantime. The feeding movement is, therefore, brought to a stop when the film is advanced a distance measured by one revolution of the gear 14. This arrangement secures a very accurate spacing of the film and achieves the results set forth in the objects of the invention.

The shutter, which is indicated as a whole by the letter S, moves in the direction of the arrow in Fig. 1 in making the exposure. The shutter is composed of two closely lying superposed blinds or curtains, the upper being indicated by the numeral 60 and the lower by the numeral 61. In Fig. 1 are indicated the two slots or apertures 60ᵃ and 61ᵃ in the respective blinds, it being noted, however, that this is not the location in which these apertures will be found in the position of the parts shown in this view. However, the drawing will show that the effective shutter opening is determined by the relative position of the blinds. Thus, in Fig. 1, the effective shutter opening is indicated by the dimension line A, which may be lengthened or shortened to change the extent of the shutter opening by shifting one blind with respect to the other.

The blind 60 is attached at one end to a drum 62 between the plates 1 and 2 and containing a coiled spring 64 which is under heavy tension when the shutter is wound or set for exposure. The blind 61 is attached to a similar spring drum 63.

Either blind may be arranged for an independent shifting or adjustment relative to the other. In the drawing the upper blind 60 is adjusted. For this purpose the blind 60 is led over a stationary guide roll 66 and thence over a shiftable guide roll 67 to a common storage or wind-up roll 69. The blind 61 passes directly to the wind-up roll 69. A hole 68 is provided in the plate 1 for insertion of the roll 69.

The loop formed by the blind 60 as it passes around the roll 67 provides the means for securing the relative adjustment of the two blinds, and this is accomplished by shifting the guide roll 67 which, for this purpose, is supported on the two sliding blocks 72 movable in the frame on guideways 73. The blocks are provided with nuts 75 which are threaded over feed screws 76 located in the slots, a worm 78 and worm gear 79 provide the means for adjusting the roll 67, a crank or key being attached to the shaft of the worm 78.

The shaft 85 of the shutter wind-up roll 69 acts as a driver during exposure when the shutter is actuated by the springs 64 in the wind-up drums 62 and 63. The shaft 85 carries a pinion 86 which meshes with the gear 88 rotatably mounted on a shaft 90 through a bushing 91. The shaft 90 is rotated in the plates 1 and 3, and on this shaft is fixed a second gear 93 which is the same size as the gear 88.

Figure 6:
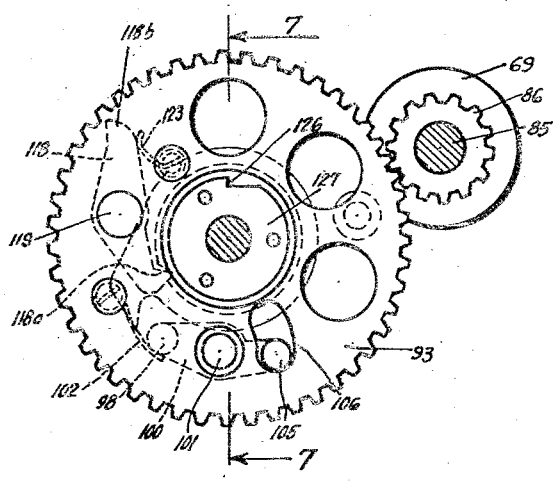
Fig. 6 is a view looking at the face of the superposed gears.

On the face of the gear 88 toward the gear 93 is fixed a cam 95 provided with a projection 96. The gear 88 is driven in a clockwise direction by the unwinding or exposure movement of the shutters, and near the end of the rotation this projection 96 strikes and passes over a pin 98 projecting inwardly from a dog 100 pivoted at 101 to the rear side of the gear 93. A leaf spring 102 bears against the end of the dog 100 to keep it in the position shown in Fig. 6 until the projection 96 strikes it at the end of the clockwise motion of the gear 88. The opposite end of the dog 100 has a pin 105 which projects outwardly through the slot 106 in the gear 93 sufficiently to contact and hold a pivoted trigger-like lever 108 which actuates the film feeding, shutter rewinding and other mechanisms, as will be described, it being sufficient at this time to say that when the parts are in the position shown in Fig. 1, the pin 105 holds these elements in fixed position.

The gear 88 is provided with a stop pin 110 which, when the shutter is rewound, as shown in Fig. 2, engages a hook 111 pivotally mounted at 112 on a bracket 113 attached to the plate 1 and hanging between the two gears 88 and 93 in the path of the pin 110. A cushion spring 115 bears against the side of the hook 111 and at its opposite end against a bracket 116 on the plate 1. The spring not only cushions the stopping of the gear 88, but will restore the gear to its proper position if it overruns slightly on its movement caused by the unwinding of the shutter.

Figure 8:
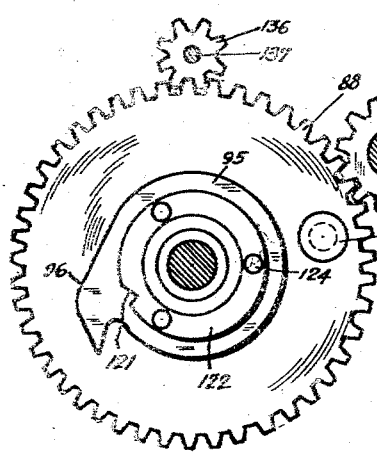
Fig. 8 is a section on the line 8—8 of Fig. 7.
Figure 7:
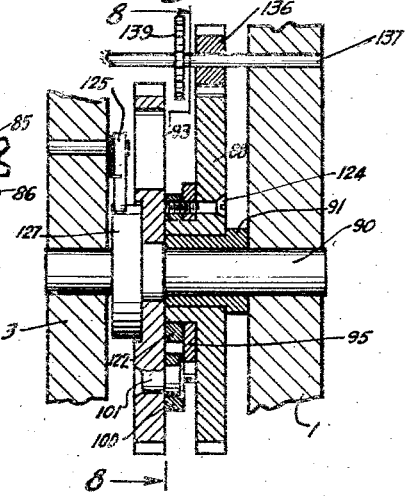
Fig. 7 is a section on the line 7—7 of Fig. 6.

When the shutter is completely wound as shown in Fig. 1, the gear 88 is held in position and the shutter prevented from unwinding by a pawl 118 pivoted at 119 on the inside face of the gear 93 and having a toothed extremity 118ᵃ which engages a notch 121 cut in the rim of a ring 122 attached to the gear 88 and lying over the cam 95 (Fig. 8). A light spring 123 bears against the tail of the pawl 118 to hold it in engagement with the notch. Screws 124 hold the parts 88, 95 and 122 together. A spring-held pawl 125 mounted on the inside of the plate 3 engages a notch 126 cut in the disk 127 attached to the gear 93 and cushions the return movement of the gear 93 and holds it in the proper initial or starting position shown in Fig. 1.

In mesh with the gear 88 is a pinion 136 mounted on a shaft 137 in the plates 1 and 3. The shaft 137 carries an escapement wheel 139 which is engaged by an escapement fork shown at 138 which controls the speed of the shutter movement.

From the description which has been given, it will be seen that when the end of the pawl 118 is lifted out of the notch 121, the force of the springs 64 in the shutter spools is released and the shutter moves across the focal plane driving the drum 69 and gear 86. This action rotates the gear 88 through somewhat less than 360° until the movement of the parts is arrested by contact of the pin 110 with the hook 111 as shown in Fig. 2. Just before the end of this movement the cam projection 96 strikes the pin 98, moving the pin 105 toward the center of the gear 93 which releases the trigger lever 108. The upper end of the lever 108 under the force of its actuating means moves to the left, assuming the position shown in Fig. 2, whereupon the driving mechanism for rewinding the shutter and advancing the film is set in motion. The light trap is also closed, as will be described.

For releasing the pawl 118 and setting the parts in motion, there is provided a striker arm or dog 140 pivoted to the plate 1 at 141, the operative end of the striker lying between the two gears 88 and 93 adjacent the tail end 118b of the pawl. The outer end of the striker is linked by a pin and slot connection 143 with the lever 144 pivoted to the plate 1 at 145. The lower end of the lever 144 lies in the path of an actuating mechanism which is controlled by the operator and is connected to a light spring 146 connected to the plate 1.

Located across the plate 1 is a bar 150 which carries a bumper member 151 which, when moved to the left as shown in Fig. 1, will strike the lower end of the lever 144 and move the striker inwardly to contact and raise the pawl 118. The bar 150 is pivoted at pin 151a to a lever 152 attached to the shaft 154 on which is mounted the right-hand leaf 155 of the light trap. The opposite end of the rod 150 is pivoted at 156 to a sector 157 pivoted at shaft 158 and connected to and actuating the left-hand leaf 159 of the light trap. A coiled torsion spring 161 surrounds the shaft 158 and moves the light trap to its open position as shown in dotted lines in Fig. 1.

Formed in the side of the sector 157 is a notch 162 in which, when the trap is closed, rests a roller 164 on the end of the arm 165 pivoted at 166 and connected at its opposite end to a link 168 attached to the armature of a solenoid 170. When the solenoid is energized by the operator, the roller 164 frees the sector 157 and the spring 161 moves the two leafs of the light trap to the dotted line position shown in Fig. 1 to admit light to the camera, the roller 162 riding over the curved end of the sector 157. A catch 172, carried by the shaft 173 rotated in the frame, seizes the end of the leaf 160 when the trap is open and holds it in position while the exposure is made so that no interference comes from the light trap during exposure. Mechanism is provided to release the catch and positive means closes the trap immediately after the picture is taken.

Immediately after the light trap is fully opened, the bumper 151 strikes the lever 144 and releases the shutter in the manner described.

When the light trap is open, the projecting end of the pivot pin 151a will rest in a notch 175 formed in the end of a pick-up arm 176 fixed to the shaft 154 as shown in dotted lines in Fig. 2. Attached to the arm 176 is one end of an adjustable link 178, the other end of which is connected to the lower end of a pivoted arm 180 mounted in the frame and serving as a light trap closing means. A spring 181 urges the arm 180 in a clockwise direction. The upper end of the arm 180, when the parts are at rest, bears against a pin 183 which projects through a slot 184 formed in the gear 26. The pin 183 is carried on the end of a rocker arm 185 pivoted at 186 on the front of the gear 26. The other end of the arm 185 carries a roller 188 which, through the urge of a spring 189, bears against a stationary cam 190 fixed to the shaft 192 about which the gear 26 rotates. It will be seen that as the gear 26 rotates in clockwise direction, as it will during the rewinding of the shutter, the arm 180 is moved by the rotation of the gear 26 so that the arm 176 is moved to close the light trap, and as the roller 188 rides up on the high part of the cam, the final closing movement of the light trap is performed and the parts restored to the full line position shown in Fig. 1. When the pin 183 has passed off the end of the arm 180, the parts 180, 178 and 176 are restored to their inactive position shown in Fig. 1. This arrangement gives a positive and quick acting operation of the light trap and the closing of the trap is assured before the shutter reaches a position where the film would be exposed.

Referring now to the action of the trigger lever 108. This lever is fixed to a shaft 195 pivotally mounted in the frame. On one side it is provided with an ear 196 to which is pivoted a yoke 198 from which extends the guide rod 199 that passes loosely through a swinging arm 200 pivotally mounted at its upper end on the shaft 201 of a sprocket 203. This shaft 201 constitutes the main driving shaft by which all of the various elements of the mechanism are operated.

Between the arm 200 and the yoke 198 is a coil spring 205, and at the end of the rod 199 is a head 206 above which is a spring 208 bearing against a slidable collar 209 which, in turn, bears against the under side of the arm 200. As the trigger lever moves to the left when released by the pin 105, the arm 200 is raised, bringing a gear 210 in mesh with the front gear 93. The gear 210 is in mesh with a pinion 212 fixed to the sprocket 203. The upward movement of the arm is arrested by the adjustable stop pin 214.

The sprocket 203 is driven by a motor 213 through the chain 215. This motor is controlled by the switch 216, which is open in the position shown in Fig. 1, but is closed by the lever 218 pivoted in the frame and connected by a link 220 to the arm 200.

The thrust lever 50 which controls the film feeding and indexing mechanism is also pivotally connected to the trigger lever 108.

It will be seen, therefore, that when the trigger lever is actuated at the end of the exposure in the manner described, the circuit to the motor is closed through the switch 216, and the gears 210 and 93 are engaged which, through the sprocket chain and connection, drives the gear 93 in a counter-clockwise direction. This, in turn, rotates the gear 26 which closes the light trap at the beginning of its rotation. As the action of the trigger lever connects the clutch 23—24 through the lever 27, the film wind-up spool will rotate by the continued movement of the gear 26 until the measuring gear completes its cycle, which, in turn, is controlled by the amount of film which has passed over the measuring roll 10.

As the gear 93 revolves, it picks up the gear 88 for its reverse movement by the movement of the pawl 118 into the notch 121 which is now lying just beyond the end of the pawl. The combined rotation of the gears continues until the pin 105 strikes the trigger lever 108 which stops both gears and restores the trigger lever to its initial position, spacing the gears 210—93 and shutting off the motor. At the same time the return movement of the trigger lever brings the pin 48 on the thrust lever 50 into the notch 46.

The rotation of the gear 88 in counter-clockwise direction winds the dual blind curtain on the roll 69 so that it is set for the next picture. The pawl 125 will restore the gear 93 to its correct position should it overrun.

It will be seen that the two gears 88 and 93 cooperate in a peculiar and distinctive manner. The gear 88 rotates in alternate directions during the unwinding and winding of the shutter, while the gear 93 always winds in the same direction and serves as a driver for gear 88 in its reverse direction.

Figure 3:
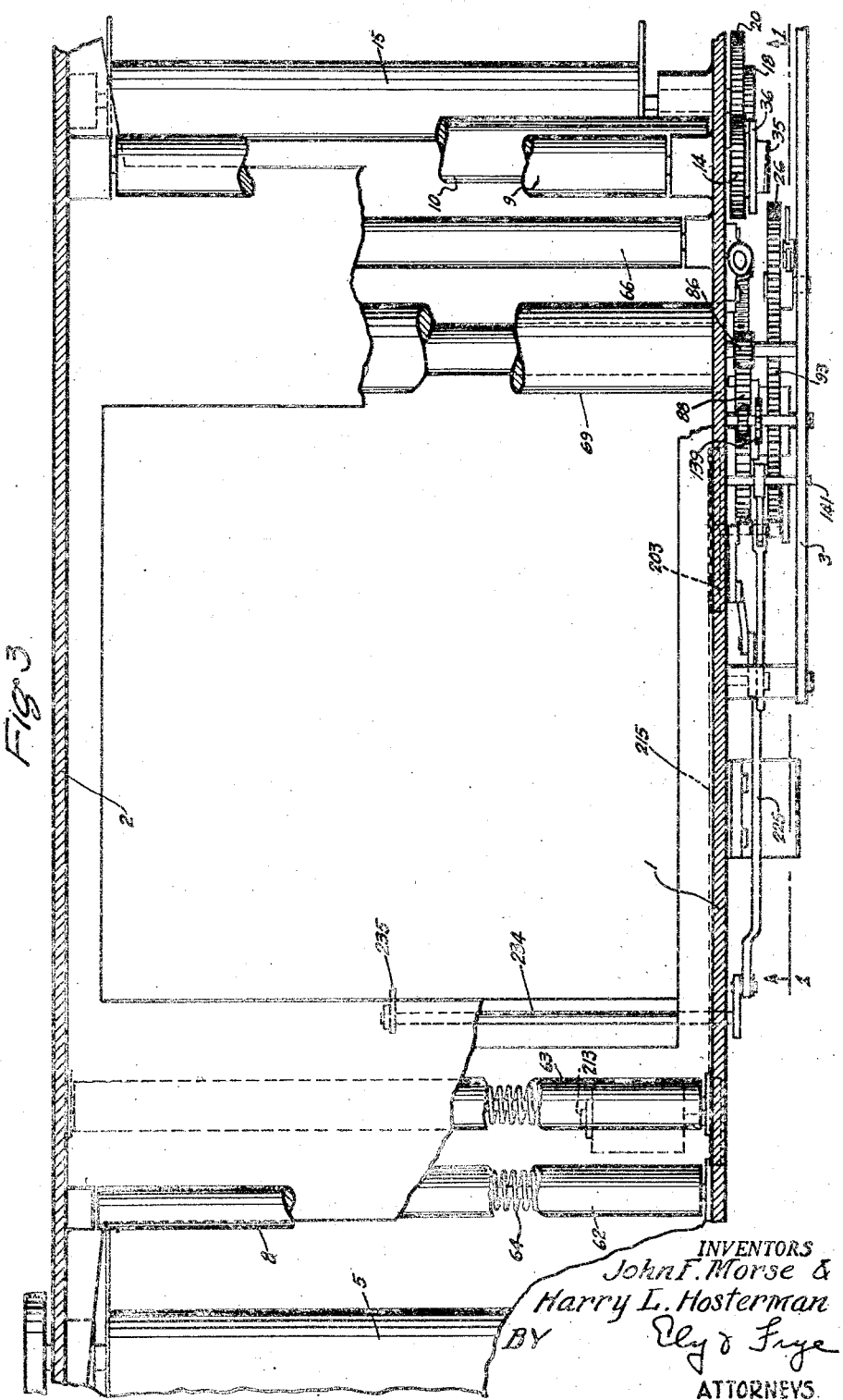
Fig. 3 is a plan view.

The trigger lever 103 has a second extension 224 to the lower end of which is pivoted the push rod 225 which extends to the left of the device and through a slot and pin connection, indicated at 227, with a lever 228 on the shaft 173 lifts the catch 172 to release the light trap. At a central point on this rod is a pivotal connection to a swinging crank bar 230 to the opposite end of which is connected a link 231 pivoted, in turn, to a lever 232 fixed on the shaft 234 which actuates the film pressing device 235 (Fig. 3) which is active during the instant that the picture is taken. The film pressing device is not shown in detail as such devices are well known in the art.

It will be noted, therefore, that the trigger lever 103 controls and actuates these additional devices just before the picture is taken.

It is believed that the operation of the camera will have been made clear from the description which has been given. The operation of the entire device is automatic and combines with a positively driven shutter rewind a device for feeding carefully measured and indexed portions of the film for each picture. The mechanism also includes means novel within itself and novel in combination for making a superior camera of the focal plane type. The description and drawings are detailed so that the invention may be clear to those skilled in this art, but variations and modifications may be employed within the scope of the invention as set forth in the appended claims.

What is claimed is:

1. In a camera, the combination of a shutter which is resettable after exposure, a film wind-up spool, power means to drive the wind-up spool and reset the shutter, a measuring roll running in contact with the surface of the film, means controlled by the extent of revolution of the measuring roll to disconnect the spool from its driving means, a separable connection between the spool and said power means, and means to close said connection during the resetting of the shutter after exposure.

2. In a camera, the combination of a film wind-up spool, power means to drive the wind-up spool, a measuring roll running in contact with and driven by the surface of the film, a clutch in the spool driving means, means to release the clutch actuated by a predetermined extent of revolution of the measuring roll, a focal plane shutter, and means for rewinding the shutter by said power means after exposure also driven by the said power means, said power means being set in operation by the unwinding of the shutter.

3. In a camera, the combination of a film wind-up spool, a motor driven main driving shaft, a focal plane shutter and a shutter rewind spool, a measuring device including a roll running in contact with the film, connections from the main driving shaft to the wind-up spool including a clutch, means actuated by the rewinding of the shutter to close the clutch and by the extent of revolution of the roll to open the clutch, a separable connection between the driving shaft and the shutter rewind spool, and means actuated by the shutter at the end of its unwinding movement to close said separable connection and by the shutter at the end of its winding movement to open said separable connection.

4. A mechanism as set forth in claim 3 having a switch for the motor operated by the shutter to make and break the circuit at the limits of the shutter travel.

5. In a camera, a film wind-up spool, a clutch connected to the spool, means to rotate the spool through the clutch, a roll running in contact with the film, a measuring gear driven by the roll, clutch operating means rotatable with the gear and also having movement independent of the gear, means actuated by the measuring gear for opening the clutch after a predetermined length of film has moved over the measuring roll, and means actuated after the exposure is completed for closing the clutch through the independent movement of the clutch operating means.

6. In a camera, a focal plane shutter, a film wind-up spool, a clutch connected to the spool, power driven means to rotate the spool through the clutch, a roll running in contact with the film, a measuring gear driven by the roll, means actuated by the measuring gear for opening the clutch after a predetermined length of film has moved over the measuring roll, and means actuated by the shutter after exposure for closing the clutch, said last named means being operated while the measuring gear is stationary.

7. In a camera, a shutter, a film wind-up spool, a roll in contact with the surface of the film, a measuring gear driven by the roll, power driving means, connections between the driving means and the spool including a clutch, means operative independently of the gear to close the clutch said last named means being operated by the shutter after the exposure, means operated by the measuring gear to open the clutch when a predetermined length of film has passed over the roll, separable connections from the driving means to the shutter for resetting the shutter, and means for rendering the shutter resetting means operative concurrently with the closing of the clutch.

8. Mechanism for automatically advancing a film after an exposure, comprising a film wind-up spool, a roll in contact with the film and driven thereby, a measuring gear driven by the roll, said gear being so related to the roll that a single revolution of the gear will correspond to a predetermined extent of film travel, power driving means having connections with the spool, a clutch in said connections, a disk rotatable by the measuring gear, a connection between the disk and the clutch, said disk having a formation to move the connection for opening and closing the clutch, and means operative after each exposure to move the disk independently of the gear for closing the clutch.

9. Mechanism for automatically advancing a film after an exposure, comprising a film wind-up spool, a roll in contact with the film and driven thereby, a measuring gear driven by the roll, said gear being so related to the roll that a single revolution of the gear will correspond to a predetermined extent of film travel, power driving means having connections with the spool, a clutch in said connections, a disk rotatable by the measuring gear and having a limited movement independent of said gear and conjoint movement therewith, a connection between the disk and the clutch, said disk having a formation to move the connection for opening and closing the clutch, and means operative after each exposure to move the disk independently of the gear for closing the clutch.

10. In a camera, a spring actuated focal plane shutter, a drum mounted upon which the shutter is wound against the spring, a gear in mesh with the drum, a second gear, a main power driven shaft, separable connections between the shaft and the second gear, a film wind-up spool, driving means from the second gear to the spool including a clutch, means to hold and release the first gear to permit the shutter to unwind, a trigger operated by the first gear at the end of the shutter unwinding movement, said trigger acting to close the separable connections to the second gear and the clutch, and means to couple the said gears for resetting the shutter.

11. In a camera, a spring actuated focal plane shutter, a drum upon which the shutter is wound against the spring, a gear in mesh with the drum, a second gear, a main power driven shaft, separable connections between the shaft and the second gear, a film wind-up spool, driving means from the second gear to the spool including a clutch, means to hold and release the first gear to permit the shutter to unwind, a trigger operated by the first gear at the end of the shutter unwinding movement, said trigger acting to close the separable connections to the second gear and the clutch, means to open the clutch when a predetermined length of film has been advanced, and means to couple the said gears for resetting the shutter.

12. A camera as set forth in claim 11 in which the clutch opening means comprises a roll in surface contact with the film and a measuring gear operated thereby.

13. In a camera, a spring actuated focal plane shutter, a light trap, a drum upon which the shutter is wound against the spring, a gear in mesh with the drum, a second gear, a main power driven shaft, separable connections between the shaft and the second gear, a film wind-up spool, driving means from the second gear to the spool including a clutch, means to hold and release the first gear to permit the shutter to unwind, a trigger operated by the first gear at the end of the shutter unwinding movement, said trigger acting to close the separable connections to the second gear and the clutch, means to close the light trap actuated upon the closing of the separable connections, and means to couple the said gears for resetting the shutter.

14. In a camera, a spring actuated focal plane shutter, a light trap, a drum upon which the shutter is wound against the spring, a gear in mesh with the drum, a second gear, a main power driven shaft, separable connections between the shaft and the second gear, a film wind-up spool, driving means from the second gear to the spool including a clutch, means to hold and release the first gear to permit the shutter to unwind, a trigger operated by the first gear at the end of the shutter unwinding movement, said trigger acting to close the separable connections to the second gear and the clutch, means to open the clutch when a predetermined length of film has been advanced, means to close the light trap actuated upon the closing of the separable connections, and means to couple the said gears for resetting the shutter.

15. In a camera, a focal plane shutter composed of two superposed spring actuated blinds, aligned apertures in the blinds, means for adjusting the relative position of the blinds to vary the effective aperture, a common drum for winding up the blinds against the spring force, a gear in mesh with the drum, means to hold and release the aforesaid gear, a second gear, a main power driven shaft, separable connections between the shaft and the second gear, a film wind-up spool, a measuring device associated with the wind-up spool, means to drive the wind-up spool from the second gear, means to couple the first and second gears for joint rotation in one direction, but to disconnect the gears when an exposure is being made, and means controlled by the measuring device to render said spool driving means ineffective when a predetermined amount of film has been advanced.

16. In a camera, a focal plane shutter composed of two superposed spring actuated blinds, aligned apertures in the blinds, means for adjusting the relative position of the blinds to vary the effective aperture, a common drum for winding up the blinds against the spring force, a gear in mesh with the drum, means to hold and release the aforesaid gear, a second gear, a main power driven shaft, separable connections between the shaft and the second gear, a film wind-up spool, a measuring device associated with the wind-up spool, means to drive the wind-up spool from the second gear, means controlled by the measuring device to render said spool driving means ineffective when a predetermined amount of film has been advanced, and means to couple the gears to rewind the drum and to uncouple the gears when an exposure is being made.

17. In a camera, a focal plane shutter composed of two superimposed spring actuated blinds, aligned apertures in the blinds, means for adjusting the relative position of the blinds to vary the effective aperture, a common drum for winding up the blinds against the spring force, a gear in mesh with the drum, means to hold and release the aforesaid gear, a second gear, means to couple the first and second gears for joint rotation in one direction, but to disconnect the gears when an exposure is being made, a main power driven shaft, separable connections between the shaft and the second gear, a film wind-up spool, a measuring device associated with the wind-up spool, means to drive the wind-up spool from the second gear, means controlled by the measuring device to render said spool driving means ineffective when a predetermined amount of film has been advanced, a light trap, and means to open and close the light trap in timed relation to the movement of the shutter.

18. A camera as set forth in claim 15 in which the measuring device includes a roll running in contact with the surface of the film.

19. A camera as set forth in claim 16 in which the measuring device includes a roll running in contact with the surface of the film.

20. In a camera, a motor driven shaft, a switch for the motor, a spring actuated focal plane shutter, a drum on which the shutter is wound against the force of the spring, a gear in driving relation to the drum, a second gear, a separable connection between the second gear and the shaft, a film wind-up spool, driving connections between the second gear and the spool, a clutch in said driving connections, means to hold and release the first gear to permit the snapping of the shutter, a trigger, means to release the trigger when the shutter is unwound, said trigger then closing the switch and closing the separable connection and the clutch, means to thereupon couple the two gears for rewinding the shutter upon the drum, a measuring device to open the clutch when a predetermined amount of film has been advanced, and means to reset the trigger and open the separable connection when the shutter is completely rewound.

21. In a camera, a motor driven shaft, a switch for the motor, a spring actuated focal plane shutter, a drum on which the shutter is wound against the force of the spring, a gear in driving relation to the drum, a second gear, a separable connection between the second gear and the shaft, a film wind-up spool, driving connections between the second gear and the spool, a clutch in said driving connections, means to hold and release the first gear to permit the snapping of the shutter, a trigger, means to release the trigger when the shutter is unwound, said trigger then closing the switch and closing the separable connection and the clutch, means to thereupon couple the two gears for rewinding the shutter upon the drum, a measuring device including a roll running in contact with the surface of the film to open the clutch when a predetermined amount of film has been advanced, and means to reset the trigger and open the separable connection when the shutter is completely rewound.

22. In a camera, a motor driven shaft, a switch for the motor, a spring actuated focal plane shutter, a drum on which the shutter is wound against the force of the spring, a gear in driving relation to the drum, a second gear, a separable connection between the second gear and the shaft, a film wind-up spool, driving connections between the second gear and the spool, a clutch in said driving connections, means to hold and release the first gear to permit the snapping of the shutter, a trigger, means to release the trigger when the shutter is unwound, said trigger then closing the switch and closing the separable connection and the clutch, means to thereupon couple the two gears for rewinding the shutter upon the drum, a measuring device to open the clutch when a predetermined amount of film has been advanced, means to reset the trigger and open the separable connection when the shutter is completely rewound, a light trap, and means operated upon release of the trigger to close the light trap.

23. In a camera, the combination of a shutter, a film wind-up spool, power means operative after an exposure to drive the wind-up spool and reset the shutter, a measuring roll running in contact with the surface of the film, a clutch for transmitting motion from the power means to the wind-up spool, means actuated by the measuring roll to render the clutch inoperative after a predetermined extent of revolution of the measuring roll, and means to restore the clutch to spool driving condition during the resetting of the shutter after exposure.

24. In a camera, the combination of a film wind-up spool, a motor driven main driving shaft, a circuit breaker for the motor, a focal plane shutter and a shutter rewind spool, means actuated by the shaft after exposure to rewind the shutter and to drive the wind-up spool, a measuring device driven by the film, a clutch in operative engagement with the wind-up spool during advancement of the film, means to render said clutch inoperative after a predetermined movement of the measuring device, and means to disconnect the shutter rewinding means and to open the circuit to the motor when the shutter is rewound.

25. In a camera, the combination of a film wind-up spool, a motor driven main driving shaft, a focal plane shutter which is unwound to make an exposure, a measuring device including a roll running in contact with the film, separable driving connections from the shaft to the shutter for rewinding the shutter, said separable driving connections being closed by the unwinding of the shutter, connections from the main driving shaft to the wind-up spool including a clutch, and means actuated by the rewinding of the shutter to render said clutch operative to transmit rotation from the shaft to the rewind spool and by the extent of revolution of the roll to render the clutch inoperative.

26. In a camera, a focal plane shutter, spring means to unwind the shutter to make an exposure, a motor driven main driving shaft, mechanism driven by the shaft for rewinding the shutter after exposure, a film wind-up spool, a second mechanism actuated by the driving shaft to rotate the wind-up spool, a measuring device actuated by the movement of the film driving connection between the measuring device and the wind-up spool, a clutch in said connections, means to render the clutch inoperative to transmit further rotation to the wind-up spool when a predetermined amount of film has been advanced, means to hold the shutter against the spring and to release the shutter, means actuated by the shutter at the end of its unwinding movement to render both said mechanisms effective to rewind the shutter and rotate the wind-up spool, respectively.

27. In a camera, a focal plane shutter, spring means to unwind the shutter to make an exposure, a motor driven main driving shaft, a switch for the motor, means to hold the shutter in wound position and to release the shutter, means to close the switch actuated on the unwinding of the shutter to start said shaft in rotation, mechanism driven by the shaft to rewind the shutter, a film wind-up spool, a measuring device associated with said wind-up spool, driving connections between said shaft and the wind-up spool, means actuated by the measuring device for rendering said driving connections inoperative after a predetermined length of film has been advanced, a light trap and means to open said light trap before the shutter is released and to close the light trap after the shutter is unwound.

28. In a camera, a focal plane shutter, spring means to unwind the shutter to make an exposure, a motor driven main driving shaft, a switch for the motor, means to hold the shutter in wound position and to release the shutter, means to close the switch actuated on the unwinding of the shutter to start said shaft in rotation, mechanism driven by the shaft to rewind the shutter, a film wind-up spool, a measuring device associated with said wind-up spool, driving connections between said shaft and the wind-up spool, means actuated by the measuring device for rendering said driving connections inoperative after a predetermined length of film has been advanced, a light trap and means to open said light trap before the shutter is released and to close the light trap after the shutter is unwound and to hold it in closed position while the shutter is rewound.

29. In a camera, a focal plane shutter, spring means to unwind the shutter to make an exposure, a motor driven main driving shaft, a switch for the motor, means to hold the shutter in wound position and to release the shutter, means to close the switch actuated on the unwinding of the shutter to start said shaft in rotation, mechanism driven by the shaft to rewind the shutter, means actuated by the unwinding of the shutter to render said mechanism operative, a film wind-up spool, a measuring device associated with said wind-up spool, driving connections between said shaft and the wind-up spool, means actuated by the measuring device for rendering said driving connections inoperative after a predetermined length of film has been advanced, a light trap and means to open said light trap before the shutter is released and to close the light trap after the shutter is unwound.

30. In a camera, a focal plane shutter, spring means to unwind the shutter to make an exposure, a motor driven main driving shaft, a switch for the motor, means to hold the shutter in wound position and to release the shutter, means to close the switch actuated on the unwinding of the shutter to start the shaft in rotation, mechanism driven by the shaft to rewind the shutter, a film wind-up spool, a second mechanism driven by the shaft to rotate the film wind-up spool, means actuated by the unwinding of the shutter to render both said mechanisms operative and means to render said second mechanism inoperative after a predetermined length of film has been advanced.

31. In a camera, a focal plane shutter, spring means to unwind the shutter to make an exposure, a motor driven main driving shaft, a switch for the motor, means to hold the shutter in wound position and to release the shutter, means to close the switch actuated on the unwinding of the shutter to start the shaft in rotation, mechanism driven by the shaft to rewind the shutter, a film wind-up spool, a second mechanism driven by the shaft to rotate the film wind-up spool, means actuated by the unwinding of the shutter to render both said mechanisms operative and means to render said second mechanism inoperative after a predetermined length of film has been advanced, a movable light trap, and mechanism to open the trap during exposure and to close the trap during the rewinding of the shutter.

32. A camera as set forth in claim 30 having means to open the switch after the cycle of operations is completed.

33. In a camera, the combination of a film wind-up spool, a motor driven main driving shaft, a circuit breaker for the motor, a focal plane shutter and a shutter rewind spool, means actuated by the shaft to rotate the wind-up spool and the shutter rewind spool after an exposure, a measuring roll in contact with and driven by the film, a clutch in driving engagement with the wind-up spool during the advancement of the film, means to disconnect the clutch after a predetermined rotation of the measuring roll, and means to disconnect the wind-up spool and the shutter rewind spool from their respective rotating means and to open the circuit to the motor when the shutter is rewound.

34. In a camera, the combination of a film wind-up spool, a motor driven main driving shaft, a focal plane shutter which is unwound to make an exposure, a shutter rewind spool, a measuring device including a roll running in contact with the film, separable driving connections from the shaft to the rewind spool for rewinding the shutter, means actuated by the unwinding of the shutter for closing said driving connections, connections from the main driving shaft to the wind-up spool including a clutch, and means actuated by the rewinding of the shutter to close the clutch and by the extent of revolution of the roll to open the clutch.

JOHN F. MORSE.
HARRY L. HOSTERMAN.

REFERENCES CITED

The following references are of record in the file of this patent:

UNITED STATES PATENTS

| Number | Name | Date |
|---|---|---|
| 2,233,345 | Hineline | Feb. 25, 1941 |
| 2,180,028 | Wittel | Nov. 14, 1939 |
| 2,257,012 | Hineline | Sept. 23, 1941 |
| 2,206,144 | Wittel | July 2, 1940 |
| 1,568,969 | Fairchild | Jan. 12, 1926 |
| 1,674,522 | Rose | June 19, 1928 |
| 1,612,860 | Fairchild | Jan. 4, 1927 |
| 2,131,926 | Weiblen et al. | Oct. 4, 1938 |
| 1,309,798 | Folmer | July 15, 1919 |
| 2,283,788 | Briechle et al. | May 19, 1942 |
| 1,879,141 | Edwards | Sept. 27, 1932 |
| 2,362,813 | Gorey et al. | Nov. 14, 1944 |
| 2,371,592 | Gorey | Mar. 13, 1945 |